United States Patent
Xiong et al.

(10) Patent No.: US 12,519,919 B2
(45) Date of Patent: Jan. 6, 2026

(54) METHOD AND SYSTEM FOR CONVERTING SINGLE-VIEW IMAGE TO 2.5D VIEW FOR EXTENDED REALITY (XR) APPLICATIONS

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 18/353,581

(22) Filed: Jul. 17, 2023

(65) Prior Publication Data

US 2024/0129448 A1  Apr. 18, 2024

Related U.S. Application Data

(60) Provisional application No. 63/414,848, filed on Oct. 10, 2022.

(51) Int. Cl.
*H04N 13/261* (2018.01)
*G06T 3/18* (2024.01)
(Continued)

(52) U.S. Cl.
CPC ............ *H04N 13/261* (2018.05); *G06T 3/18* (2024.01); *G06T 5/77* (2024.01); *G06T 7/50* (2017.01);
(Continued)

(58) Field of Classification Search
CPC .. H04N 13/271; H04N 13/128; H04N 13/344; H04N 2213/003; H04N 13/261;
(Continued)

(56) References Cited

U.S. PATENT DOCUMENTS

| 9,996,936 B2 | 6/2018 | Arth et al. | |
| 2013/0076744 A1* | 3/2013 | Kida | G06T 7/50 |
| | | | 345/420 |

(Continued)

FOREIGN PATENT DOCUMENTS

WO  2018075053 A1  4/2018

OTHER PUBLICATIONS

Hedman et al., "Baking Neural Radiance Fields for Real-Time View Synthesis", arXiv:2103.14645v1 [cs.CV], Mar. 2021, 15 pages.

*Primary Examiner* — Xiao M Wu
*Assistant Examiner* — Scott E Sonners

(57) ABSTRACT

A method includes obtaining a 2D image captured using an imaging sensor. The 2D image is associated with an imaging sensor pose. The method also includes providing the 2D image, the imaging sensor pose, and one or more additional imaging sensor poses to at least one machine learning model that is trained to generate a texture map and a depth map for the imaging sensor pose and each additional imaging sensor pose. The method further includes generating a stereo image pair based on the texture maps and the depth maps. The stereo image pair represents a 2.5D view of the 2D image. The 2.5D view includes a pair of images each including multiple collections of pixels and, for each collection of pixels, a common depth associated with the pixels in the collection of pixels. In addition, the method includes initiating display of the stereo image pair on an XR device.

20 Claims, 7 Drawing Sheets

(51) Int. Cl.
  *G06T 5/77* (2024.01)
  *G06T 7/50* (2017.01)
  *G06T 7/593* (2017.01)
  *G06T 7/70* (2017.01)
  *G06T 15/04* (2011.01)
  *G06T 17/00* (2006.01)
  *G06T 19/00* (2011.01)
  *H04N 13/122* (2018.01)
  *H04N 13/271* (2018.01)

(52) U.S. Cl.
  CPC ............ *G06T 7/593* (2017.01); *G06T 7/70* (2017.01); *G06T 15/04* (2013.01); *G06T 17/00* (2013.01); *H04N 13/271* (2018.05); *G06T 19/006* (2013.01); *G06T 2207/20081* (2013.01); *G06T 2207/20212* (2013.01); *G06T 2207/30244* (2013.01); *H04N 13/122* (2018.05)

(58) Field of Classification Search
  CPC ........... G06T 15/04; G06T 2207/10028; G06T 17/20; G06T 7/50; G06T 2207/10024; G06T 2207/20084; G06T 15/205; G06T 19/20; G06T 17/00; G06T 2207/20081; G06T 19/006; G06T 15/20; G06T 19/00; G06T 7/40; G06T 7/70; G06T 2207/30201; G06T 7/73; G06T 11/001; G06T 2207/30244; G06T 7/529; G06T 2207/10021; G06T 5/70; G06T 2207/10012; G06T 15/10; G06T 2200/08; G06T 7/90; G06T 15/00; G06T 11/40; G06T 2207/20228; G06T 3/18; G06T 2215/16; G06T 5/60; G06T 13/20; G06T 9/002; G06T 2219/024; G06F 3/011; G06V 10/82; G06V 40/168; G06V 20/64

See application file for complete search history.

(56) References Cited

U.S. PATENT DOCUMENTS

| | | | |
|---|---|---|---|
| 2017/0085863 A1* | 3/2017 | Lopez | H04N 13/261 |
| 2018/0108138 A1 | 4/2018 | Kluckner et al. | |
| 2020/0349772 A1 | 11/2020 | Tkach et al. | |
| 2020/0358997 A1 | 11/2020 | O'Keefe et al. | |
| 2021/0248772 A1 | 8/2021 | Iqbal et al. | |
| 2023/0334754 A1* | 10/2023 | Kirchmayer | G06T 17/00 |
| 2024/0249422 A1* | 7/2024 | Jampani | G06T 5/77 |
| 2024/0296531 A1* | 9/2024 | Chou | G06T 5/20 |

* cited by examiner

METHOD AND SYSTEM FOR CONVERTING SINGLE-VIEW IMAGE TO 2.5D VIEW FOR EXTENDED REALITY (XR) APPLICATIONS

CROSS-REFERENCE TO RELATED APPLICATION AND PRIORITY CLAIM

This application claims priority under 35 U.S.C. § 119(e) to U.S. Provisional Patent Application No. 63/414,848 filed on Oct. 10, 2022, which is hereby incorporated by reference in its entirety.

TECHNICAL FIELD

This disclosure relates generally to extended reality (XR) devices and processes. More specifically, this disclosure relates to a method and system for converting a single-view image to a 2.5D view for XR applications.

BACKGROUND

Extended reality (XR) systems are becoming more and more popular over time. XR systems generally include (without limitation) virtual reality (VR) systems, augmented reality (AR) systems, and mixed reality (MR) systems. A VR system typically creates a computer-generated environment around a user, which generally involves completely replacing the user's view of his or her current environment with the computer-generated environment. An AR system typically enhances a user's view of his or her current environment by overlaying content (such as information or digital objects) over the user's view of the current environment. An MR system is often considered to be somewhat in between VR and AR systems, where the MR system generates a combination of real-world and digital content for viewing by a user.

SUMMARY

This disclosure relates to a method and system for converting a single-view image to a 2.5D view for extended reality (XR) applications.

In a first embodiment, a method includes obtaining a two-dimensional (2D) image captured using an imaging sensor, where the 2D image is associated with an imaging sensor pose of the imaging sensor. The method also includes providing the 2D image, the imaging sensor pose, and one or more additional imaging sensor poses as inputs to at least one machine learning model. The at least one machine learning model is trained to generate a texture map and a depth map for the imaging sensor pose associated with the 2D image and for each of the one or more additional imaging sensor poses. The method further includes generating a stereo image pair based on the texture maps and the depth maps, where the stereo image pair represents a 2.5-dimensional (2.5D) view of the 2D image. The 2.5D view includes a pair of images each including (i) multiple collections of pixels and (ii) for each collection of pixels, a common depth associated with the pixels in the collection of pixels. In addition, the method includes initiating display of the stereo image pair on an XR device.

In a second embodiment, an XR device includes an imaging sensor configured to capture a 2D image, where the 2D image is associated with an imaging sensor pose of the imaging sensor. The XR device also includes at least one processing device configured to provide the 2D image, the imaging sensor pose, and one or more additional imaging sensor poses as inputs to at least one machine learning model. The at least one machine learning model is trained to generate a texture map and a depth map for the imaging sensor pose associated with the 2D image and for each of the one or more additional imaging sensor poses. The at least one processing device is also configured to generate a stereo image pair based on the texture maps and the depth maps, where the stereo image pair represents a 2.5D view of the 2D image. The 2.5D view includes a pair of images each including (i) multiple collections of pixels and (ii) for each collection of pixels, a common depth associated with the pixels in the collection of pixels. The XR device further includes one or more displays configured to present the stereo image pair.

In a third embodiment, a non-transitory machine readable medium contains instructions that when executed cause at least one processor of an XR device to obtain a 2D image captured using an imaging sensor, where the 2D image is associated with an imaging sensor pose of the imaging sensor. The non-transitory machine readable medium also contains instructions that when executed cause the at least one processor to provide the 2D image, the imaging sensor pose, and one or more additional imaging sensor poses as inputs to at least one machine learning model. The at least one machine learning model is trained to generate a texture map and a depth map for the imaging sensor pose associated with the 2D image and for each of the one or more additional imaging sensor poses. The non-transitory machine readable medium further contains instructions that when executed cause the at least one processor to generate a stereo image pair based on the texture maps and the depth maps, where the stereo image pair represents a 2.5D view of the 2D image. The 2.5D view includes a pair of images each including (i) multiple collections of pixels and (ii) for each collection of pixels, a common depth associated with the pixels in the collection of pixels. In addition, the non-transitory machine readable medium contains instructions that when executed cause the at least one processor to initiate display of the stereo image pair on the XR device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
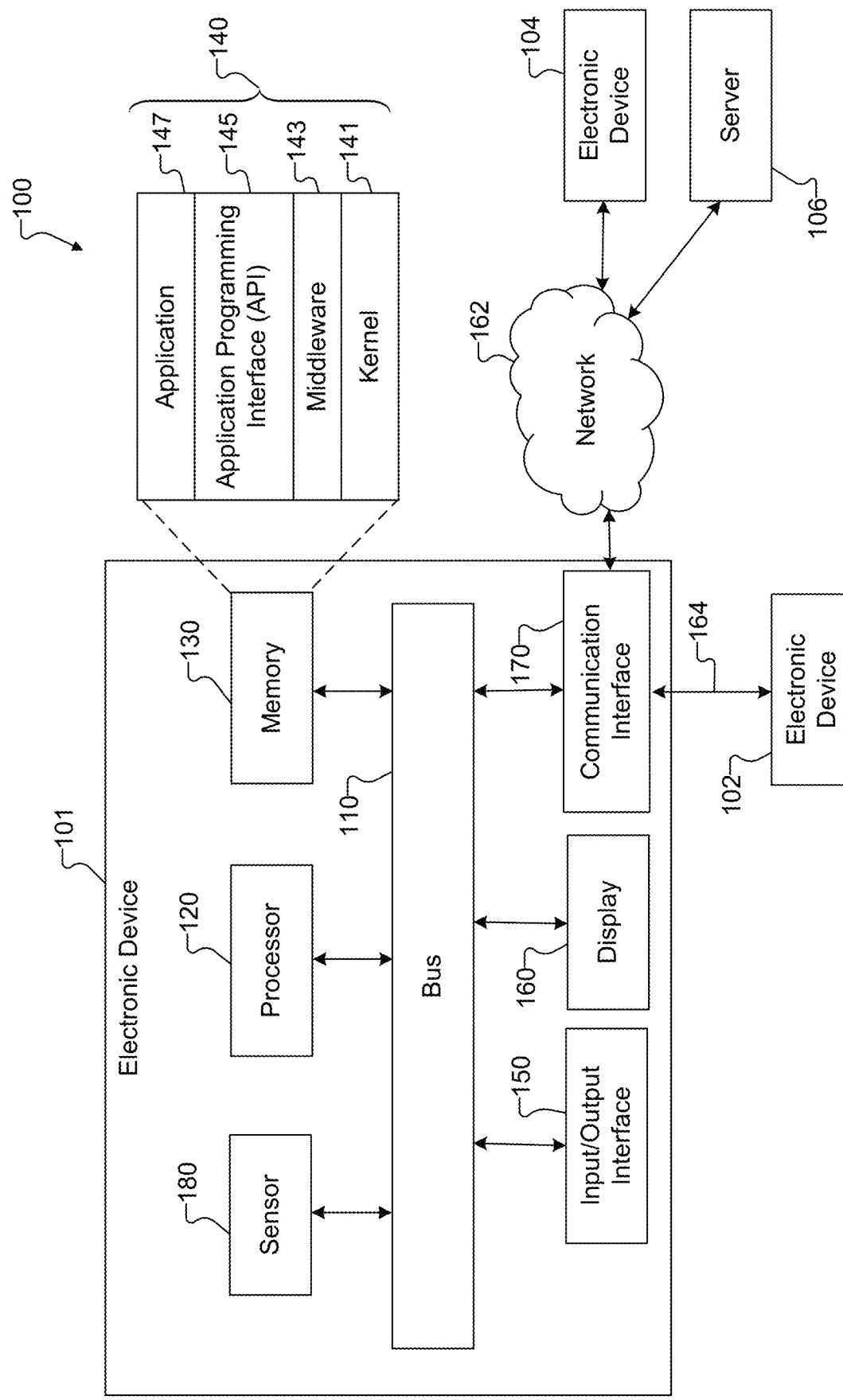
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, extended reality (XR) systems are becoming more and more popular over time. XR systems generally include (without limitation) virtual reality (VR) systems, augmented reality (AR) systems, and mixed reality (MR) systems. A VR system typically creates a computer-generated environment around a user, which generally involves completely replacing the user's view of his or her current environment with the computer-generated environment. An AR system typically enhances a user's view of his or her current environment by overlaying content (such as information or digital objects) over the user's view of the current environment. An MR system is often considered to be somewhat in between VR and AR systems, where the MR system generates a combination of real-world and digital content for viewing by a user. In many XR systems, one goal of the system is to allow a user to view a virtual, augmented, or mixed three-dimensional (3D) space around the user. However, many XR systems display two-dimensional (2D) images on displays of the XR systems to the users. As a result, these XR systems generally do not leverage the 3D spaces that are available around the users.

This disclosure provides techniques for converting single-view 2D images into 2.5D views for XR applications. As described in more detail below, a 2D image captured using an imaging sensor is obtained, where the 2D image is associated with an imaging sensor pose of the imaging sensor. The 2D image, the imaging sensor pose, and one or more additional imaging sensor poses are provided as inputs to at least one machine learning model. The at least one machine learning model is trained to generate a texture map and a depth map for the imaging sensor pose associated with the 2D image and for each of the one or more additional imaging sensor poses. A stereo image pair is generated based on the texture maps and the depth maps. The stereo image pair represents a 2.5-dimensional (2.5D) view of the 2D image, where the 2.5D view includes a pair of images each including (i) multiple collections of pixels and (ii) for each collection of pixels, a common depth associated with the pixels in the collection of pixels. The stereo image pair can be presented on at least one display of an XR device.

In this way, texture maps and depth maps are generated from a single-view 2D image using a machine learning-based approach. A stereoscopic image pair can be generated using the texture map and the depth map associated with the 2D image and its associated pose, which allows a 2.5D scene to be created. One or more holes in the stereoscopic image pair can be filled using one or more texture maps and one or more depth maps associated with one or more other poses. The resulting stereoscopic image pair can be displayed to a user using one or more displays of an XR device. As a result, the techniques described below can provide a superior immersive experience for users of XR devices by converting flat images to include depth, which can greatly enhance the users' experiences. Moreover, by generating 2.5D images (which include depth information for groups of pixels) rather than true 3D images (which include depth information for each individual pixel), the techniques described below can reduce processing loads and speed up generation of content for display.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may perform one or more functions related to converting single-view images to 2.5D views for at least one XR application.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, convert single-view images to 2.5D views for at least one XR application. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 include one or more cameras or other imaging sensors, which may be used to capture images of scenes. The sensor(s) 180 can also include at least one depth sensor for estimating depths within scenes being imaged. The sensor(s) 180 can further include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electro-myography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an XR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to converting single-view images to 2.5D views for at least one XR application.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
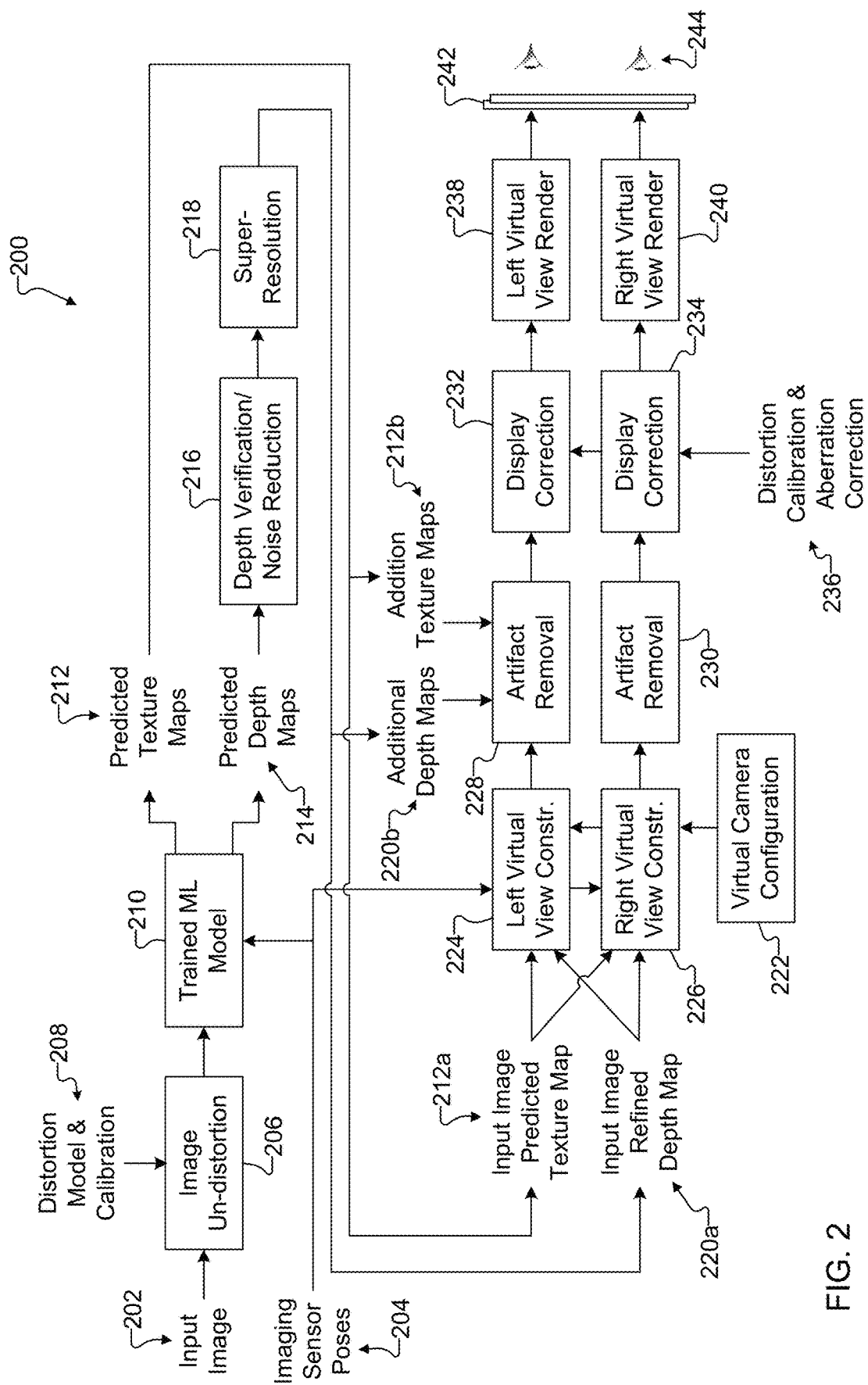
FIG. 2 illustrates an example architecture for converting a single-view image to a 2.5D view for extended reality (XR) applications in accordance with this disclosure.

FIG. 2 illustrates an example architecture 200 for converting a single-view image to a 2.5D view for XR applications in accordance with this disclosure. For ease of explanation, the architecture 200 may be described as being implemented using the electronic device 101 in the network configuration 100 of FIG. 1. However, the architecture 200 may be implemented using any other suitable device(s) and in any other suitable system(s).

As shown in FIG. 2, the architecture 200 obtains an input image 202 and multiple imaging sensor poses 204. The input image 202 represents a 2D image that is obtained using an imaging sensor, such as an imaging sensor 180 of the electronic device 101. The input image 202 can have any suitable resolution and dimensions depending on the capabilities of the imaging sensor 180. The input image 202 can also include image data in any suitable format. In some embodiments, for instance, the input image 202 includes RGB image data, which typically includes image data in three color channels (namely red, green, and blue color channels). However, the input image 202 may include image data having any other suitable form or arrangement.

The imaging sensor poses 204 represent a pose of the imaging sensor 180 or the electronic device 101 when the input image 202 was captured and at least one additional pose of the imaging sensor 180 or the electronic device 101. The pose of an imaging sensor or electronic device generally represents the position and orientation of the imaging sensor or electronic device within a specified environment, such as the environment around a user of the electronic device 101. In some cases, each imaging sensor pose 204 may be expressed using six degrees of freedom (6 DoF), which can include three distances and three angles. The three distances typically represent the position of the imaging sensor or electronic device relative to a fixed location, such as the imaging sensor or electronic device's position from the fixed location as expressed in distances along three orthogonal axes. The three angles typically represent the orientation of the imaging sensor or electronic device about these three axes, such as the imaging sensor or electronic device's pitch, roll, and yaw. The imaging sensor poses 204 may be obtained in any suitable manner. For instance, the pose of the imaging sensor or electronic device when the input image 202 was captured may be determined using one or more other sensors 180 of the electronic device 101, such as an inertial measurement unit, accelerometer, gyroscope, or other component(s). The at least one additional pose of the imaging sensor may represent at least one other pose of the imaging sensor or electronic device.

The input image 202 is provided to an image un-distortion operation 206, which generally operates to remove distortion from the input image 202. For example, the input image 202 may be distorted due to the physical or operational characteristics of the imaging sensor 180 that captured the input image 202, and the image un-distortion operation 206 can operate to warp or otherwise reduce or remove these distortions from the input image 202. In some embodiments, the image un-distortion operation 206 may have access to a distortion model and imaging sensor calibration parameters 208 and may use this information to perform the image un-distortion. The distortion model represents a model of how the imaging sensor 180 is known to distort images, which (in some cases) may be generated during calibration of the imaging sensor 180. For instance, the imaging sensor 180 may capture images of known objects or scenes so that differences between captured and expected images may be identified and used to produce a model of how the imaging sensor 180 distorts the known objects or scenes. The imaging sensor calibration parameters represent specific parameters of the design or operation of the imaging sensor 180, such as the imaging sensor's focal length.

The modified or "un-distorted" image produced by the un-distortion operation 206 is provided to a trained machine learning (ML) model 210. The trained machine learning model 210 also receives the imaging sensor poses 204. The trained machine learning model 210 represents a machine learning model that has been trained to process the input image 202 and the imaging sensor poses 204 in order to generate predicted texture maps 212 and predicted depth maps 214 associated with the input image 202. Each predicted texture map 212 identifies the texture(s) contained in the input image 202, where each predicted texture map 212 is associated with one of the imaging sensor poses 204. Each predicted depth map 214 identifies the depth(s) of different pixels or groups of pixels within the input image 202. In some embodiments, the trained machine learning model 210 can be trained to produce the predicted texture maps 212 and the predicted depth maps 214 simultaneously for the different imaging sensor poses 204 using the same input image 202.

As described below, the trained machine learning model 210 is trained to learn the relationships between inputs of colors and camera poses and outputs of texture maps and depth maps. As a result, the trained machine learning model 210 can subsequently be provided an input image 202 and imaging sensor poses 204 and generate corresponding predicted texture maps 212 and predicted depth maps 214. In some embodiments, the predicted texture maps 212 may have the same resolution as the input image 202, and the predicted depth maps 214 may have a lower resolution than the input image 202. The trained machine learning model 210 may use any suitable technique to generate texture and depth maps based on input images and imaging sensor poses and can have any suitable machine learning model-based structure. In some embodiments, for instance, the trained machine learning model 210 may represent or include a convolutional neural network (CNN), deep learning network (DNN), or other machine learning model.

The predicted depth maps 214 are provided to a depth verification and noise reduction operation 216, which generally operates to compare the depths in the predicted depth maps 214 in order to identify and correct erroneous depths and reduce other noise within the predicted depth maps 214. For example, the depth verification and noise reduction operation 216 may identify points within the predicted depth maps 214 associated with common locations in a scene (as captured by the input image 202) and verify whether the predicted depth maps 214 include generally-consistent depths for those common locations. If not, the depth verification and noise reduction operation 216 may average the identified depths for those common locations, select the identified depths that are more-consistently identified across multiple predicted depth maps 214, or otherwise operate to replace inconsistent depths with more consistent values in the predicted depth maps 214. This may result in the creation of "corrected" predicted depth maps.

The corrected predicted depth maps are provided to a super-resolution operation 218, which generally operates to increase the resolution of the corrected predicted depth maps. For example, the super-resolution operation 218 may use a guided super-resolution process in order to increase the resolutions of the corrected predicted depth maps in order to obtain high-resolution depth maps. In some cases, the high-resolution depth maps may have a resolution that matches the resolution of the input image 202.

The overall results of the process performed by the architecture 200 at this point include (i) a predicted texture map 212a associated with the input image 202 at the imaging sensor pose 204 where the input image 202 was captured and (ii) one or more additional predicted texture maps 212b associated with the input image 202 at the one or more additional imaging sensor poses 204. The overall results of the process performed by the architecture 200 at this point also include (i) a refined depth map 220a associated with the input image 202 at the imaging sensor pose 204 where the input image 202 was captured and (ii) one or more additional depth maps 220b associated with the input image 202 at the one or more additional imaging sensor poses 204. As noted above, each additional imaging sensor pose 204 refers to a pose of the imaging sensor 180 or electronic device 101 when the input image 202 was not captured.

A virtual camera configuration operation 222 generally operates to define a left virtual camera position and a right virtual camera position. Each virtual camera position defines the position of a virtual camera to be used when creating content for display to a user of the electronic device 101. In some cases, the virtual camera configuration operation 222 can operate based on one or more parameters of the electronic device 101. As described below, for instance, the virtual camera configuration operation 222 can define the left and right virtual camera positions based on an inter-pupillary distance (IPD) associated with the electronic device 101 or the user.

The input image predicted texture map 212a and the input image refined depth map 220a are provided to left and right virtual view construction operations 224 and 226. The virtual view construction operations 224, 226 generally operate to produce a left virtual view and a right virtual view of content to be presented to the user. For example, the virtual view construction operations 224 and 226 can warp and project the input image predicted texture map 212a and the input image refined depth map 220a to a plane as defined by one of the virtual camera positions in order to produce a first virtual view and a projected depth map, the projected depth map can be used to produce a parallax map, and the first virtual view and the parallax map can be used to produce a second virtual view. This results in the generation of left and right virtual views of the content to be presented to the user. The parallax map identifies the disparities between the left and right virtual views.

Because the left and right virtual views are formed using projections, it may be common for at least one of the left and right virtual views to include projection artifacts. This is often due to the fact that the positions of the virtual cameras are not in the same location as the imaging sensor 180 that captured the input image 202. As a result, sampling artifacts and occluded areas can be present in one or more of the left and right virtual views. Artifact removal operations 228 and 230 are used to respectively correct for sampling, projection, or other artifacts in the left and right virtual views. As shown here, the artifact removal operations 228 and 230 can use at least one of the one or more additional texture maps 212b and at least one of the one or more additional depth maps 220b when correcting for the sampling, projection, or other artifacts. As a particular example, each artifact removal operation 228, 230 may identify at least one hole in the associated left or right virtual view caused by at least one occlusion and use contents from the additional texture map(s) 212b and the additional depth map(s) 220b to fill in the hole(s). Note that the additional imaging sensor pose(s) 204 (meaning the pose or poses not associated with the pose of the imaging sensor 180 or electronic device 101 when the input image 202 was captured) can be defined in any suitable manner, such as based on one or more parameters of the virtual cameras (such as inter-pupillary distance) and include one or more poses relevant to the imaging sensor 180 used to capture the input image 202.

The left and right virtual views as modified by the artifact removal operations 228 and 230 are provided to display correction operations 232 and 234, which generally operate to modify the left and right virtual views based on one or more displays 242 to be used for presenting the left and right virtual views. For example, the display correction operations 232 and 234 may have access to information 236 that defines expected distortions and aberrations that may be created by the display(s) 242 during presentation of the left and right virtual views. The display correction operations 232 may therefore pre-process the left and right virtual views in order to compensate for the expected distortions and aberrations that may be created by the display(s) 242. In some cases, the distortion and aberration information may be obtained based on prior calibrations involving the display(s) 242. As particular examples, the display correction operations 232 and 234 may be used to correct for expected geometric distortions and chromatic aberrations created by the display(s) 242.

The left and right virtual views as modified by the display correction operations 232 and 234 are provided to left and right virtual view rendering operations 238 and 240, which generally operate to render left and right images for presentation on the one or more displays 242. For example, the virtual view rendering operations 238 and 240 can generate left and right images that (from the perspective of the user) make it appear as if virtual content is present in the environment around the user. The left and right images generated by the virtual view rendering operations 238 and 240 represent a stereo image pair that is produced based on the predicted texture maps 212 and predicted depth maps 214 produced by the trained machine learning model 210. The left and right rendered images are presented on the display(s) 242. Note that the display(s) 242 here may represent two separate displays (such as left and right displays separately viewable by the eyes 244 of the user) or a single display (such as one where left and right portions of the display are separately viewable by the eyes 244 of the user).

In this example, the stereo image pair that is generated and presented to the user represents a 2.5-dimensional (2.5D) view of the input image 202 (which is a 2D image). A 2.5D view generally refers to a view of a scene that includes some depth information, but the depth information is not necessarily provided for each location in the scene. Rather, each image in the stereo image pair can include multiple collections of pixels, such as pixels in different layers of image data or pixels in different portions within the scene. For each collection of pixels, a common depth can be associated with the pixels in that collection of pixels. This type of approach can reduce the number of computations needed and can speed up the process of generating the 2.5D view based on the input image 202. This can be particularly useful since the architecture 200 may be used to process a large number of input images 202 sequentially in order to provide a stream of stereo image pairs to the display(s) 242 for presentation to the user.

Note that the operations in the architecture 200 described above may be implemented in various ways in different implementations of the architecture 200. For example, the artifact removal operations 228 and 230 are described above as being used to fill in content in holes within the left and right virtual views using the additional texture map(s) 212b and the additional depth map(s) 220b. In other embodiments, at least one additional machine learning model may be trained to process the left and right virtual views and fill in any holes within the left and right virtual views. As a particular example, DNN-based approaches, such as those using a generative adversarial network (GAN), may be used to generate content to fill in holes within the left and right virtual views. As another example, the trained machine learning model 210 is described above as being used to produce both the predicted texture maps 212 and the predicted depth maps 214. In other embodiments, separate trained machine learning models 210 may be used to produce the predicted texture maps 212 and the predicted depth maps 214.

Overall, the architecture 200 described above can be faster and more efficient compared to other algorithms. For example, the architecture 200 can require fewer computational resources for determining depth information from single-view images. Moreover, the architecture 200 can be easily integrated into a graphics rendering pipeline of a GPU or other component, which can reduce or avoid the need to transfer data back-and-forth with a CPU or other component and thereby reduce latency and memory consumption. In addition, converting a 2D image to a 2.5D view takes less computational power and fewer resources than converting the same 2D image to a 3D view, since true depths and volume reconstruction are not needed. Among other things, these benefits can allow the architecture 200 to be used by electronic devices having smaller processing powers.

It should be noted that the functions shown in or described with respect to FIG. 2 can be implemented in an electronic device 101, 102, 104, server 106, or other device(s) in any suitable manner. For example, in some embodiments, at least some of the functions shown in or described with respect to FIG. 2 can be implemented or supported using one or more software applications or other software instructions that are executed by the processor 120 of the electronic device 101, 102, 104, server 106, or other device(s). In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of an architecture 200 for converting a single-view image to a 2.5D view for XR applications, various changes may be made to FIG. 2. For example, various components and functions in FIG. 2 may be combined, further subdivided, replicated, omitted, or rearranged according to particular needs. Also, one or more additional components or functions may be included if needed or desired. In addition, while FIG. 2 illustrates various pairs of operations occurring in parallel (such as the operations 224-226, operations 228-230, operations 232-234, or operations 238-240), other embodiments may perform a common operation sequentially multiple times in order to achieve the same or similar results.

Figure 3:
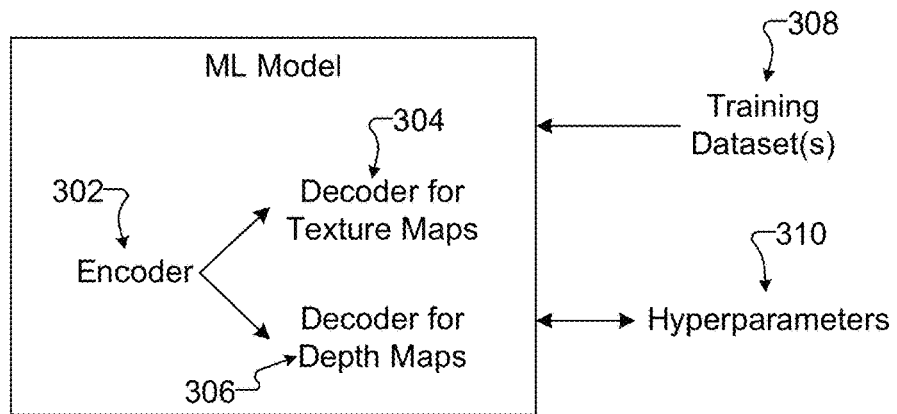
FIG. 3 illustrates an example training of a machine learning model used in the architecture of FIG. 2 in accordance with this disclosure.

FIG. 3 illustrates an example training of a machine learning model 210 used in the architecture 200 of FIG. 2 in accordance with this disclosure. As shown in FIG. 3, the machine learning model 210 includes an encoder 302, a first decoder 304, and a second decoder 306. The encoder 302 generally operates to receive input images 202 and imaging sensor poses 204 and to encode the contents of the input images 202 and the imaging sensor poses 204. This allows specific features to be extracted from the input images 202 and the imaging sensor poses 204 for further processing, where those features are determined during training to be useful in generating predicted texture maps 212 and predicted depth maps 214. The first decoder 304 generally operates to use the extracted features in order to produce predicted texture maps 212, and the second decoder 306 generally operates to use the extracted features in order to produce predicted depth maps 214.

One or more training datasets 308 are used here to train the machine learning model 210. For example, each training dataset 308 may include a set of images and a corresponding set of depth maps, and the set of images and the corresponding set of depth maps can be labeled with imaging sensor poses at which the set of images were captured. In some cases, the set of images can include image sequences that are captured for 3D scene reconstruction. The machine learning model 210 processes the set of images and generates predicted depth maps 214, and the predicted depth maps 214 are compared with the set of depth maps in the training dataset 308. In this example, the set of depth maps in the training dataset 308 represent ground truths for the training process. Differences or errors between the predicted depth maps 214 and the set of depth maps in the training dataset 308 are identified and used to determine a loss value associated with the machine learning model 210. If the loss value exceeds a threshold, hyperparameters 310 of the machine learning model 210 can be adjusted, and the set of images from the same training dataset 308 or a different training dataset 308 can be provided to the updated machine learning model 210. The updated machine learning model 210 uses the set of images to generate additional predicted depth maps 214 that are compared to the corresponding set of depth maps in the training dataset 308 in order to calculate an additional loss value. Ideally, the loss value decreases over time, and this process can continue until the machine learning model 210 accurately generates predicted depth maps 214 (at least to within some specified level of accuracy as defined by the threshold). During this process, the machine learning model 210 learns the relationships between the image and sensor pose inputs and the depth map outputs. Note that a similar process may occur for producing the predicted texture maps 212, in which case the training dataset(s) 308 may include at least one set of images and at least one corresponding set of texture maps.

Although FIG. 3 illustrates one example of training of a machine learning model 210 used in the architecture 200 of FIG. 2, various changes may be made to FIG. 3. For example, the specific technique for training the machine learning model 210 may vary based on (among other things) the type(s) of machine learning structure(s) used in the machine learning model(s) 210.

Figure 4:
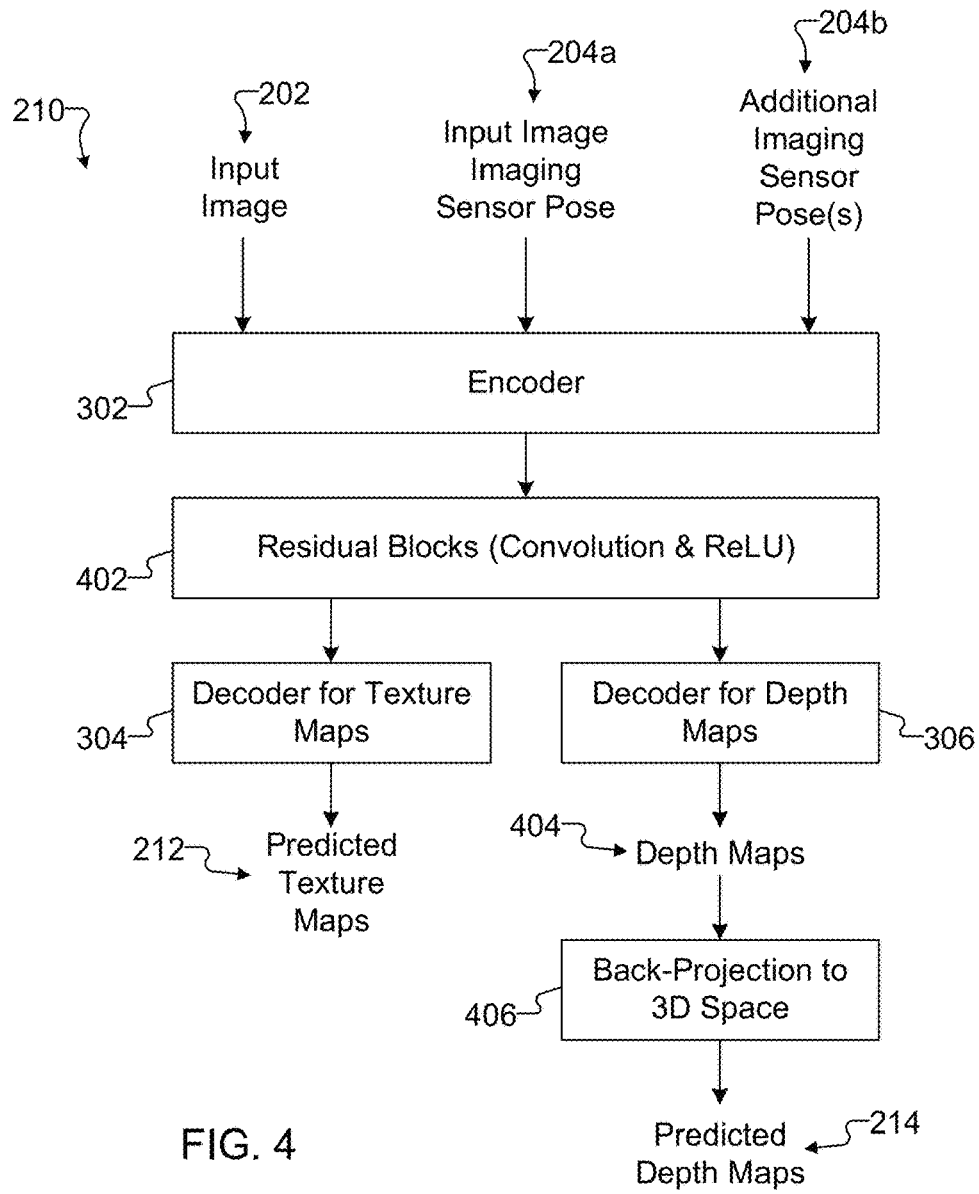
FIG. 4 illustrates an example machine learning model used in the architecture of FIG. 2 in accordance with this disclosure.

FIG. 4 illustrates an example machine learning model 210 used in the architecture 200 of FIG. 2 in accordance with this disclosure. As shown in FIG. 4, the encoder 302 of the machine learning model 210 receives the input image 202 and the imaging sensor poses 204. Here, the imaging sensor poses 204 are divided into an input image imaging sensor pose 204a and one or more additional imaging sensor poses 204b. The input image imaging sensor pose 204a represents the pose of the imaging sensor 180 or the electronic device 101 during capture of the input image 202. The one or more additional imaging sensor poses 204b represent one or more additional poses of the imaging sensor 180 or the electronic device 101 (meaning poses that the imaging sensor 180 or the electronic device 101 did not actually have during capture of the input image 202).

The encoder 302 here encodes these inputs and provides the encoded inputs to a sequence of residual blocks 402. The residual blocks 402 process the encoded inputs using a series of convolutional layers with rectified linear unit (ReLU) activation functions in order to produce feature maps. The feature maps contain features of the input image 202 and the imaging sensor poses 204a-204b as determined by the residual blocks 402. The feature maps from the residual blocks 402 are decoded in two branches. One branch includes the decoder 304, which processes the feature maps in order to produce the predicted texture maps 212 for the input image 202 with the different poses 204a-204b. Another branch includes the decoder 306, which processes the feature maps in order to produce initial depth maps 404 for the input image 202 with the different poses 204a-204b. A back-projection operation 406 can be performed using the initial depth maps 404 in order to project the initial depth maps 404 into a 3D space, thereby producing the predicted depth maps 214 for the input image 202 with the different poses 204a-204b. Note that the predicted texture maps 212 and the predicted depth maps 214 can be spatially aligned here.

By generating the predicted texture maps 212 and the predicted depth maps 214 for both (i) the input image 202 at the input image imaging sensor pose 204a and (ii) the input image 202 at the one or more additional imaging sensor poses 204b, the additional predicted texture map(s) 212b and the additional depth map(s) 220b can be provided for use during hole filling or other operations by the artifact removal operations 228 and 230. Thus, during the construction of the left and right virtual views in the architecture 200, holes can be created when occluded regions are dis-occluded. The additional predicted texture map(s) 212b and the additional depth map(s) 220b can be used to provide real image-based information for filling in these holes, thereby avoiding the need to artificially invent content to fill the holes (which can create further artifacts).

Although FIG. 4 illustrates one example of a machine learning model 210 used in the architecture 200 of FIG. 2, various changes may be made to FIG. 4. For example, the internal logical structure of the machine learning model 210 can vary depending on the specific type(s) of machine learning model(s) being used in the architecture 200. As a particular example, separate machine learning models 210 may be provided, such as when one machine learning model 210 includes the left branch to produce the predicted texture maps 212 and another machine learning model 210 includes the right branch to produce the predicted depth maps 214.

Figure 5:
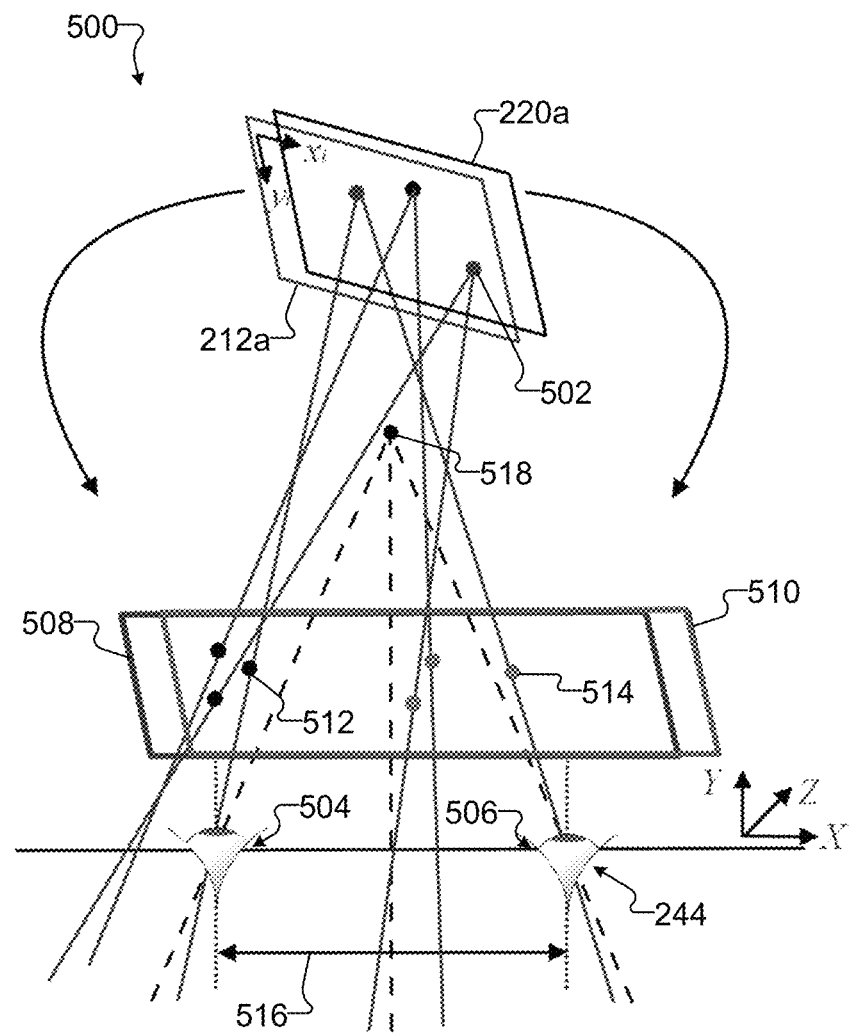
FIG. 5 illustrates an example generation of virtual views associated with a stereo image pair in accordance with this disclosure.

FIG. 5 illustrates an example generation 500 of virtual views associated with a stereo image pair in accordance with this disclosure. The example shown here represents one example technique for producing the left and right virtual views in the architecture 200 of FIG. 2 using a single input image 202. As described above, the left and right virtual views are subsequently used to form a stereo image pair that is presented on the display(s) 242 of the electronic device 101.

As shown in FIG. 5, the predicted texture map 212a and the refined depth map 220a for the input image 202 are illustrated. Here, the predicted texture map 212a includes various points 502, which simply represent points within the scene being imaged. The architecture 200 operates to project the predicted texture map 212a and the refined depth map 220a to virtual camera positions 504 and 506, which may be defined based on one or more parameters or configurations of the electronic device 101. This results in the generation of a left virtual view 508 and an overlapping right virtual view 510. In this example, the left virtual view 508 includes points 512 corresponding to how the points 502 of the predicted texture map 212a would appear from the perspective of the user's left eye 244, and the right virtual view 510 includes points 514 corresponding to how the points 502 of the predicted texture map 212a would appear from the perspective of the user's right eye 244. An inter-pupillary distance 516 is identified here and may represent the parameter (or one of the parameters) used to define the virtual camera positions 504 and 506.

In some embodiments, the refined depth map 220*a* is warped and transformed based on the positions 504 and 506 of the virtual cameras to create a parallax map between the left virtual view 508 and the right virtual view 510. A stereo image pair is created with the left and right virtual views 508, 510 and rendered in order to provide a 2.5D view of the input image 202. Parallax refers to the difference in perceived positions of the same point when viewed along different lines-of-sight. As can be seen in FIG. 5, for instance, the same point 502 in the predicted texture map 212*a* can be perceived at different locations in the left and right virtual views 508 and 510 due to the different lines-of-sight between the user's eyes 244 and that point 502 in the predicted texture map 212*a*, and this difference is used as the disparity or parallax for that point 502. A zero parallax point 518 in FIG. 5 represents the location along a central optical axis where the parallax changes sign. For example, the parallax can be negative from the user's eyes 244 to the zero parallax point 518, and the parallax can be positive beyond the zero parallax point 518. The actual location of the zero parallax point 518 can vary based on (among other things) the size of the inter-pupillary distance 516.

Figure 6:
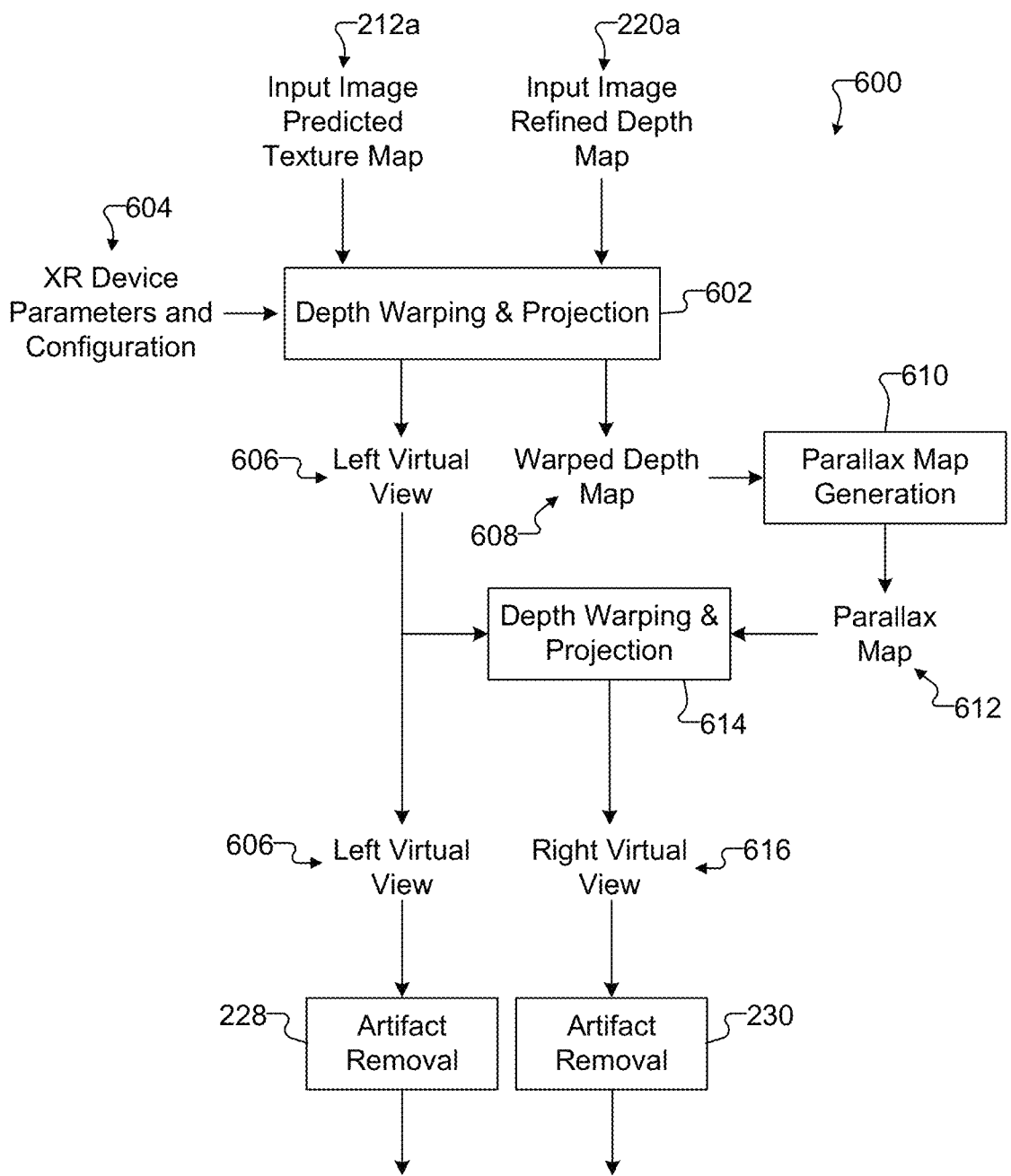
FIG. 6 illustrates an example process for generating virtual views associated with a stereo image pair in the architecture of FIG. 2 in accordance with this disclosure.

FIG. 6 illustrates an example process 600 for generating virtual views associated with a stereo image pair in the architecture 200 of FIG. 2 in accordance with this disclosure. Among other things, the process 600 shown here is based on the technique for generating virtual views as shown in FIG. 5 and described above. In some cases, the process 600 here represents operations performed by the left and right virtual view construction operations 224 and 226.

As shown in FIG. 6, the input image predicted texture map 212*a* and the input image refined depth map 220*a* are provided to a depth projection and warping operation 602. The depth projection and warping operation 602 can also receive one or more parameters or configurations 604 of the electronic device 101, such as the inter-pupillary distance 516 associated with the electronic device 101. In some embodiments, the inter-pupillary distance associated with the electronic device 101 may be adjustable, such as via mechanical adjustment to the electronic device 101.

The depth warping and projection operation 602 generally operates to perform warping and projection computations in order to transform the input image predicted texture map 212*a* to the position of the left virtual camera and produce a left virtual view 606 of the input image predicted texture map 212*a*. The same types of warping and projection computations can be performed in order to transform the input image refined depth map 220*a* to the position of the left virtual camera and produce a warped depth map 608. The warped depth map 608 is provided to a parallax map generation function 610, which generally operates to process the warped depth map 608 and produce a parallax map 612. In some embodiments, the parallax map 612 is generated by identifying the disparity between pixel locations at the left and right virtual camera positions. Depth and disparity are related to one another, and in some cases this relationship can be defined as follows.

$$\text{disparity} = \frac{Bf}{d}$$

Here, B is the inter-pupillary distance 516, f is the focal length of the imaging sensor 180 used to capture the input image 202, and d represents depth as defined in the warped depth map 608. The parallax map generation function 610 can use this relationship to convert the depth values contained in the warped depth map 608 into corresponding parallax values contained in the parallax map 612.

Another depth warping and projection operation 602 generally operates to perform warping and projection computations in order to transform the left virtual view 606 into a right virtual view 616 based on the parallax map 612. In these embodiments, the left and right virtual views are used to form a stereo image pair, and the epipolar lines of the left and right virtual views are colinear in the horizontal direction as shown in FIG. 5. As a result, pixels in the right virtual view 616 can be determined using corresponding pixels in the left virtual view 606 and corresponding parallax values in the parallax map 612. The left and right virtual views 606, 616 are processed using the artifact removal operations 228 and 230 and used to produce a stereo image pair forming a 2.5D view of the input image 202 as described above.

Although FIG. 5 illustrates one example of the generation 500 of virtual views associated with a stereo image pair, various changes may be made to FIG. 5. For example, the number of points shown here are for illustration and explanation only. Also, the input image predicted texture map 212*a* and the input image refined depth map 220*a* may have any suitable orientation relative to the user's eyes 244. Although FIG. 6 illustrates one example of a process 600 for generating virtual views associated with a stereo image pair in the architecture 200 of FIG. 2, various changes may be made to FIG. 6. For instance, while FIG. 6 shows two instances of operations 602, 614 and two instances of operations 228, 230, each pair of operations may be implemented using a common operation performed sequentially multiple times. Also, while FIG. 6 illustrates generation of the right virtual view 616 based on projection of the left virtual view 606, the right virtual view 616 may be generated and projected in order to produce the left virtual view 606.

Figure 7:
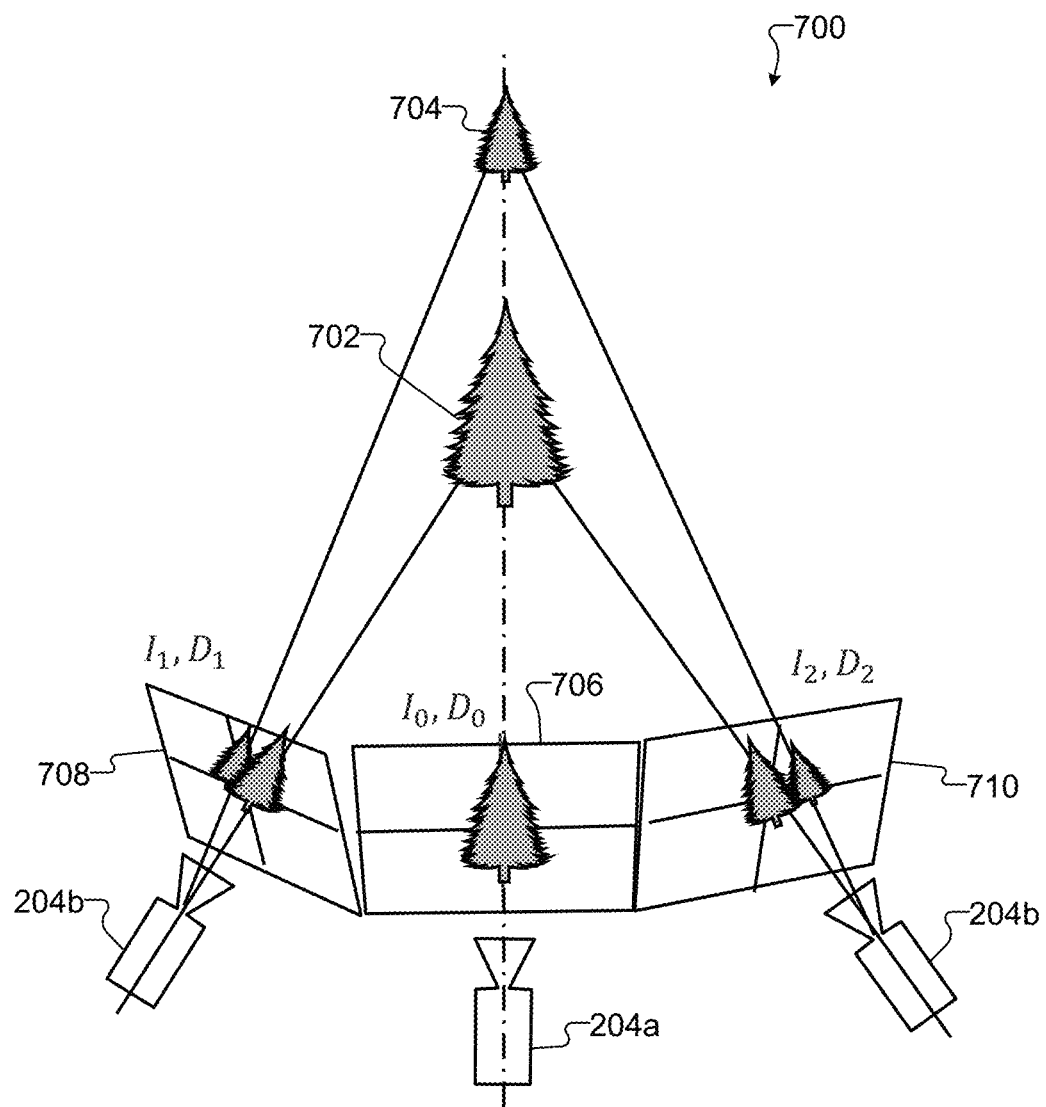
FIG. 7 illustrates an example process for removing rendering artifacts in accordance with this disclosure.

FIG. 7 illustrates an example process 700 for removing rendering artifacts in accordance with this disclosure. The example shown here represents one example technique for removing artifacts using the artifact removal operations 228 and 230 in the architecture 200 of FIG. 2.

As shown in FIG. 7, there are two 3D objects 702 and 704 in a scene, namely a larger object 702 that is closer and a smaller object 704 that is farther away. If a single imaging sensor pose 204*a* is used, the larger object 702 partially or completely occludes the smaller object 704. Thus, texture and depth maps ($I_0$, $D_0$) 706 produced using an image captured by an imaging sensor 180 having the imaging sensor pose 204*a* may capture the larger object 702 and little if any portion of the smaller object 704. However, the viewpoint of the single-view image captured at the imaging sensor pose 204*a* is not the same as the viewpoints of left and right virtual camera positions. As a result, some information may not be available when a stereo view is created at the virtual camera positions using only the single-view image, which can lead to the creation of artifacts (such as one or more holes).

The techniques described above help to compensate for this type of issue by generating one or more additional sets of texture and depth maps ($I_1$, $D_1$) 708 and ($I_2$, $D_2$) 710 based on one or more additional imaging sensor poses 204*b*. In this example, there are multiple additional texture maps and multiple additional depth maps produced, and the additional imaging sensor poses 204*b* are positioned around the input image imaging sensor pose 204*a*.

After suitable training of the machine learning model 210, the trained machine learning model 210 can receive the input image 202 and the imaging sensor poses 204, and the trained machine learning model 210 can generate and output the texture and depth maps ($I_0$, $D_0$) 706 associated with the input image 202 at the imaging sensor pose 204a. The trained machine learning model 210 can also generate and output the texture and depth maps ($I_1$, $D_1$) 708 and ($I_2$, $D_2$) 710 identified based on the additional imaging sensor poses 204b. As described above, the texture and depth maps ($I_1$, $D_1$) 708 and ($I_2$, $D_2$) 710 can be used to fill in any holes in the texture and depth maps ($I_0$, $D_0$) 706 associated with the input image 202 at the imaging sensor pose 204a. It is therefore possible to generate a stereo image pair for display to a user based on the texture and depth maps ($I_0$, $D_0$) 706 associated with the input image 202 at the imaging sensor pose 204a and to reduce or remove artifacts based on the texture and depth maps ($I_1$, $D_1$) 708 and ($I_2$, $D_2$) 710.

Although FIG. 7 illustrates one example of a process 700 for removing rendering artifacts, various changes may be made to FIG. 7. For example, the number and positions of the additional imaging sensor poses 204b can vary depending on the circumstances. Also, as noted above, other approaches (such as the use of an additional machine learning model) may be used to remove rendering artifacts from views or images.

Figure 8:
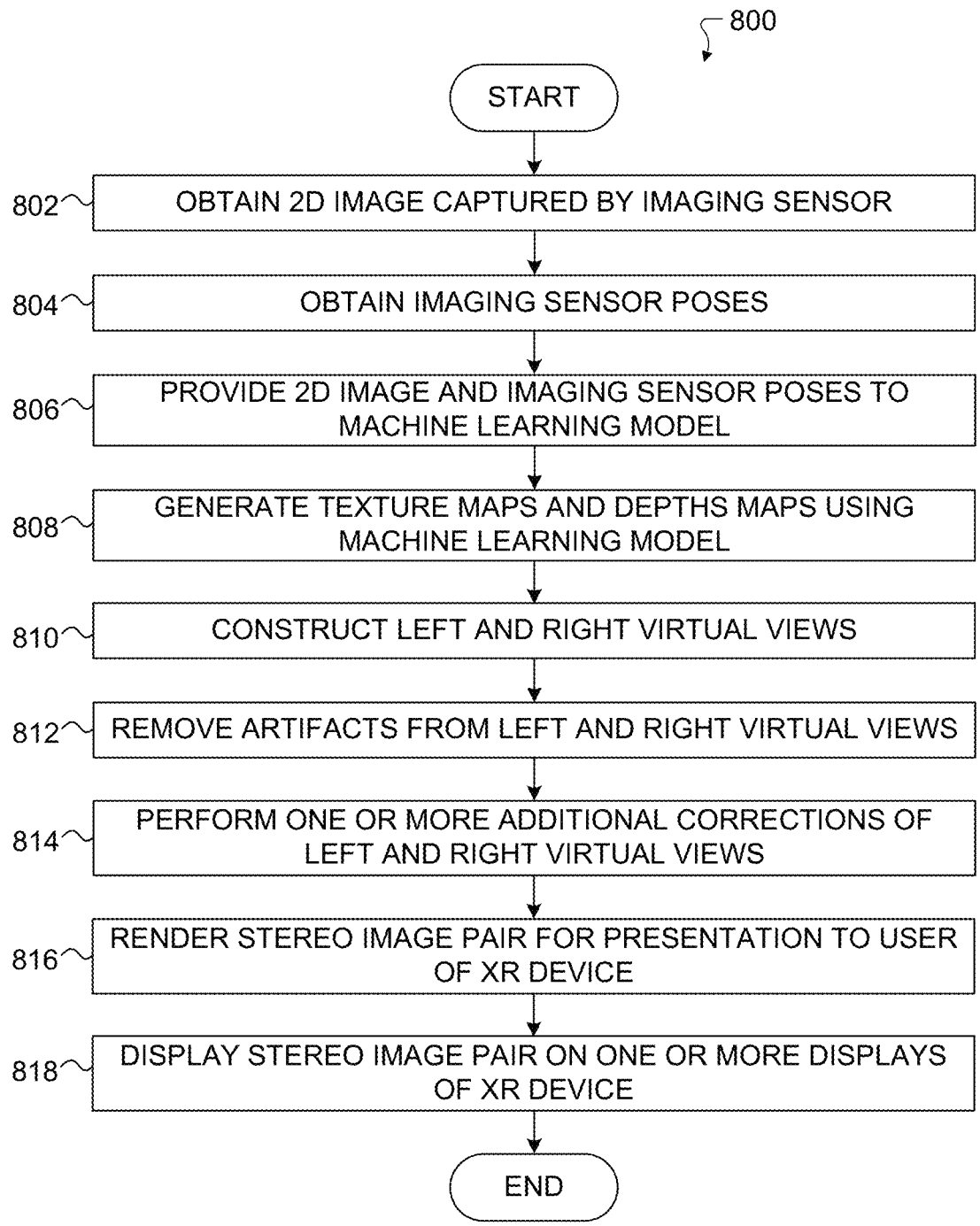
FIG. 8 illustrates an example method for converting a single-view image to a 2.5D view for XR applications in accordance with this disclosure.

FIG. 8 illustrates an example method 800 for converting a single-view image to a 2.5D view for XR applications in accordance with this disclosure. For ease of explanation, the method 800 may be described as being performed by the electronic device 101 in the network configuration 100 of FIG. 1, where the electronic device 101 implements the architecture 200 of FIG. 2. However, the method 800 may be performed using any other suitable device(s) and architecture(s) and in any other suitable system(s).

As shown in FIG. 8, a 2D image captured using an imaging sensor is obtained at step 802. This may include, for example, the processor 120 of the electronic device 101 obtaining an input image 202 that was captured using an imaging sensor 180 of the electronic device 101. Imaging sensor poses associated with the imaging sensor or electronic device are obtained at step 804. This may include, for example, the processor 120 of the electronic device 101 obtaining multiple imaging sensor poses 204, at least one of which may be provided by an inertial measurement unit, accelerometer, gyroscope, or other component(s) of the electronic device 101. The multiple imaging sensor poses 204 include an input image imaging sensor pose 204a representing the pose of the imaging sensor 180 or the electronic device 101 during capture of the input image 202, as well as one or more additional imaging sensor poses 204b.

The 2D image and the imaging sensor poses are provided as inputs to at least one trained machine learning model at step 806. This may include, for example, the processor 120 of the electronic device 101 providing the input image 202, the input image imaging sensor pose 204a, and the one or more additional imaging sensor poses 204b to the trained machine learning model(s) 210. The at least one machine learning model generates a texture map and a depth map for the imaging sensor pose associated with the 2D image and for each of the one or more additional imaging sensor poses at step 808. This may include, for example, the processor 120 of the electronic device 101 using the machine learning model 210 to generate predicted texture maps 212 and predicted depth maps 214 associated with the input image 202. Each of the imaging sensor poses 204 can have an associated predicted texture map 212 and an associated predicted depth map 214. In some cases, the machine learning model 210 can generate the predicted texture maps 212 and the predicted depth maps 214 simultaneously for the imaging sensor poses 204.

Left and right virtual views are constructed at step 810. This may include, for example, the processor 120 of the electronic device 101 constructing left and right virtual views 508 and 510 that include digital content to be provided to a user. In some embodiments, this may include the processor 120 of the electronic device 101 using the input image predicted texture map 212a and the input image refined depth map 220a to construct the left and right virtual views 508 and 510. As a particular example, the processor 120 of the electronic device 101 may use the input image predicted texture map 212a and the input image refined depth map 220a to create a first virtual view and a warped depth map, generate a parallax map using the warped depth map, and warp the first virtual view using the parallax map to generate a second virtual view.

One or more artifacts in one or more of the left and right virtual views may be removed at step 812. This may include, for example, the processor 120 of the electronic device 101 filling in one or more holes in one or more of the left and right virtual views 508 and 510. In some embodiments, this may include the processor 120 of the electronic device 101 using at least one of the one or more additional predicted texture maps 212b and at least one of the one or more additional depth maps 220b (which are associated with at least one of the one or more additional imaging sensor poses 204b). As a particular example, the processor 120 of the electronic device 101 may detect at least one hole in at least one of the left and right virtual views 508, 510 and fill the at least one hole using information from one or more of the additional texture maps 212b and one or more of the additional depth maps 220b. One or more additional corrections may be applied to the left and right virtual views at step 814. This may include, for example, the processor 120 of the electronic device 101 performing display correction to pre-compensate for expected distortions and aberrations that may be created by the display(s) 242 during presentation of the left and right virtual views 508, 510.

A stereo image pair is rendered for presentation to the user at step 816. This may include, for example, the processor 120 of the electronic device 101 rendering the left and right virtual views 508, 510 in order to generate left and right images for display on the display(s) 242 of the electronic device 101. The stereo image pair represents a 2.5D view of the input image 202. As noted above, each image in the stereo image pair can include multiple collections of pixels (such as multiple layers or multiple groups of pixels) and, for each collection of pixels, a common depth associated with the pixels in that collection of pixels. The stereo image pair is displayed on an XR device at step 818. This may include, for example, the processor 120 of the electronic device 101 initiating display of the stereo image pair on the display(s) 242 of the electronic device 101.

Although FIG. 8 illustrates one example of a method 800 for converting a single-view image to a 2.5D view for XR applications, various changes may be made to FIG. 8. For example, while shown as a series of steps, various steps in FIG. 8 may overlap, occur in parallel, occur in a different order, or occur any number of times. As a particular example, the method 800 may be performed repeatedly in order to generate any number of 2.5D views based on any number of input images 202.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
obtaining a two-dimensional (2D) image captured using an imaging sensor, the 2D image associated with an imaging sensor pose of the imaging sensor;
providing the 2D image, the imaging sensor pose, and one or more additional imaging sensor poses as inputs to at least one machine learning model, the at least one machine learning model trained to generate a texture map and a depth map for the imaging sensor pose associated with the 2D image and for each of the one or more additional imaging sensor poses;
generating a stereo image pair based on the texture maps and the depth maps, the stereo image pair representing a 2.5-dimensional (2.5D) view of the 2D image, the 2.5D view comprising a pair of images each including (i) multiple collections of pixels and (ii) for each collection of pixels, a common depth associated with the pixels in the collection of pixels; and
initiating display of the stereo image pair on an extended reality (XR) device.

2. The method of claim 1, wherein generating the stereo image pair comprises:
generating a left virtual view and a right virtual view to be presented on the XR device based on the texture map and the depth map associated with the 2D image and one or more parameters of the XR device;
detecting at least one hole in at least one of the left virtual view and the right virtual view; and
filling the at least one hole using information from one or more of the texture maps and one or more of the depth maps associated with at least one of the one or more additional imaging sensor poses.

3. The method of claim 2, wherein filling the at least one hole comprises using an additional machine learning model trained to remove projection artifacts from rendered images.

4. The method of claim 2, wherein the one or more parameters of the XR device comprise an inter-pupillary distance associated with the XR device.

5. The method of claim 1, wherein:
the at least one machine learning model is trained using a training dataset; and
the training dataset includes a set of images and a corresponding set of depth maps, the set of images and the corresponding set of depth maps labeled with poses at which the set of images were captured.

6. The method of claim 1, wherein the at least one machine learning model simultaneously generates the texture maps and the depth maps for the imaging sensor pose and the one or more additional imaging sensor poses.

7. The method of claim 1, wherein generating the stereo image pair comprises:
warping the texture map and the depth map for the imaging sensor pose associated with the 2D image to a first virtual camera position in order to generate a first virtual view and a warped depth map;
generating a parallax map using the warped depth map; and
warping the first virtual view using the parallax map to generate a second virtual view.

8. An extended reality (XR) device comprising:
an imaging sensor configured to capture a two-dimensional (2D) image, the 2D image associated with an imaging sensor pose of the imaging sensor;
at least one processing device configured to:
provide the 2D image, the imaging sensor pose, and one or more additional imaging sensor poses as inputs to at least one machine learning model, the at least one machine learning model trained to generate a texture map and a depth map for the imaging sensor pose associated with the 2D image and for each of the one or more additional imaging sensor poses; and
generate a stereo image pair based on the texture maps and the depth maps, the stereo image pair representing a 2.5-dimensional (2.5D) view of the 2D image, the 2.5D view comprising a pair of images each including (i) multiple collections of pixels and (ii) for each collection of pixels, a common depth associated with the pixels in the collection of pixels; and
one or more displays configured to present the stereo image pair.

9. The XR device of claim 8, wherein, to generate the stereo image pair, the at least one processing device is configured to:
generate a left virtual view and a right virtual view to be presented on the one or more displays based on the texture map and the depth map associated with the 2D image and one or more parameters of the XR device;
detect at least one hole in at least one of the left virtual view and the right virtual view; and
fill the at least one hole using information from one or more of the texture maps and one or more of the depth maps associated with at least one of the one or more additional imaging sensor poses.

10. The XR device of claim 9, wherein, to fill the at least one hole, the at least one processing device is configured to use an additional machine learning model trained to remove projection artifacts from rendered images.

11. The XR device of claim 9, wherein the one or more parameters of the XR device comprise an inter-pupillary distance associated with the XR device.

12. The XR device of claim 8, wherein:
the at least one machine learning model is trained using a training dataset; and
the training dataset includes a set of images and a corresponding set of depth maps, the set of images and the corresponding set of depth maps labeled with poses at which the set of images were captured.

13. The XR device of claim 8, wherein the at least one machine learning model is configured to simultaneously generate the texture maps and the depth maps for the imaging sensor pose and the one or more additional imaging sensor poses.

14. The XR device of claim 8, wherein, to generate the stereo image pair, the at least one processing device is configured to:
warp the texture map and the depth map for the imaging sensor pose associated with the 2D image to a first virtual camera position in order to generate a first virtual view and a warped depth map;
generate a parallax map using the warped depth map; and
warp the first virtual view using the parallax map to generate a second virtual view.

15. A non-transitory machine readable medium containing instructions that when executed cause at least one processor of an extended reality (XR) device to:

obtain a two-dimensional (2D) image captured using an imaging sensor, the 2D image associated with an imaging sensor pose of the imaging sensor;

provide the 2D image, the imaging sensor pose, and one or more additional imaging sensor poses as inputs to at least one machine learning model, the at least one machine learning model trained to generate a texture map and a depth map for the imaging sensor pose associated with the 2D image and for each of the one or more additional imaging sensor poses;

generate a stereo image pair based on the texture maps and the depth maps, the stereo image pair representing a 2.5-dimensional (2.5D) view of the 2D image, the 2.5D view comprising a pair of images each including (i) multiple collections of pixels and (ii) for each collection of pixels, a common depth associated with the pixels in the collection of pixels; and initiate display of the stereo image pair on the XR device.

16. The non-transitory machine readable medium of claim 15, wherein the instructions that when executed cause the at least one processor to generate the stereo image pair comprise:

instructions that when executed cause the at least one processor to:

generate a left virtual view and a right virtual view to be presented on the XR device based on the texture map and the depth map associated with the 2D image and one or more parameters of the XR device;

detect at least one hole in at least one of the left virtual view and the right virtual view; and fill the at least one hole using information from one or more of the texture maps and one or more of the depth maps associated with at least one of the one or more additional imaging sensor poses.

17. The non-transitory machine readable medium of claim 16, wherein the instructions that when executed cause the at least one processor to fill the at least one hole comprise:

instructions that when executed cause the at least one processor to use an additional machine learning model trained to remove projection artifacts from rendered images.

18. The non-transitory machine readable medium of claim 15, wherein:

the at least one machine learning model is trained using a training dataset; and the training dataset includes a set of images and a corresponding set of depth maps, the set of images and the corresponding set of depth maps labeled with poses at which the set of images were captured.

19. The non-transitory machine readable medium of claim 15, wherein the at least one machine learning model is configured to simultaneously generate the texture maps and the depth maps for the imaging sensor pose and the one or more additional imaging sensor poses.

20. The non-transitory machine readable medium of claim 15, wherein the instructions that when executed cause the at least one processor to generate the stereo image pair comprise:

instructions that when executed cause the at least one processor to:

warp the texture map and the depth map for the imaging sensor pose associated with the 2D image to a first virtual camera position in order to generate a first virtual view and a warped depth map;

generate a parallax map using the warped depth map; and warp the first virtual view using the parallax map to generate a second virtual view.

* * * * *